(12) United States Patent
Kogure et al.

(10) Patent No.: US 6,256,937 B1
(45) Date of Patent: Jul. 10, 2001

(54) PREVENTION OF DAMAGES OF CONSTRUCTION MATERIALS BY TERMITES

(75) Inventors: Naochika Kogure; Takashi Kitahama, both of Utsunomiya; Kiyotaka Nanama, Hiratsuka; Hiroyuki Gokuraku, Utsunomiya, all of (JP)

(73) Assignee: JSP Corporation (JP)

( * ) Notice: Subject to any disclaimer, the term of this patent is extended or adjusted under 35 U.S.C. 154(b) by 0 days.

(21) Appl. No.: 09/212,399

(22) Filed: Dec. 16, 1998

(30) Foreign Application Priority Data

Dec. 17, 1997 (JP) .................................... 9-364068
Jul. 29, 1998 (JP) .................................. 10-214543

(51) Int. Cl.[7] ..................................................... A01K 3/00
(52) U.S. Cl. .............................. 52/101; 47/121; 47/132; 47/133
(58) Field of Search ..................... 52/101, 309.1, 52/309.5, 406.1, 404.1, 220.2, 505, 169.5; 43/121, 132, 133; 119/61; 521/79.97

(56) References Cited

U.S. PATENT DOCUMENTS

| 5,097,641 | * | 3/1992 | Hand et al. ........................... 52/101 |
| 5,623,793 | * | 4/1997 | Kyomen et al. .................... 52/169.5 |
| 5,706,620 | * | 1/1998 | De Zen ............................... 52/309.1 |
| 5,735,090 | * | 4/1998 | Papke .................................... 52/439 |
| 5,854,294 | * | 12/1998 | Hirosawa et al. ..................... 521/79 |

* cited by examiner

Primary Examiner—Richard Chilcot
(74) Attorney, Agent, or Firm—Lorusso & Loud

(57) ABSTRACT

Prevention of damage of wooden construction materials of a building by termites by laying one or more panels each having a polycarbonate resin foam layer on the ground on which the building is constructed or by arranging such panels on surfaces of continuous footing of the building or of vertical concrete walls of the building. The concrete wall may be formed using modular concrete form structure units each having a pair of opposing side panels, with each side panel having a polycarbonate foam layer.

17 Claims, 1 Drawing Sheet

PREVENTION OF DAMAGES OF CONSTRUCTION MATERIALS BY TERMITES

BACKGROUND OF THE INVENTION

This invention relates generally to resisting attack of cellulose materials by termites. More particularly, the present invention relates to a method of constructing a wall such as a continuous footing for constructing a building thereon or a concrete wall for a reinforced concrete building. The present invention is also directed to a composite panel useful as a building material and to a modular wall form structure.

Because of good heat insulation properties, polystyrene foam and polyolefin foam have been utilized as foundation insulation. However, such a plastic foam gives rise to a problem of damage of wooden pillars and walls by termites, since the plastic foam provides ideal nesting and tunneling conditions for termites and permits undetected access to wood materials of buildings.

While termite damage may be reduced by incorporating a termiticide in the foam, the termiticide adversely affects the human body. The use of termiticides also causes a difficulty in reuse of the foam.

SUMMARY OF THE INVENTION

It is, therefore, an object of the present invention to provide a method of preventing damage of wooden construction materials of a building by termites.

Another object of the present invention is to provide a method of constructing a wall extending from the ground.

It is a further object of the present invention to provide a continuous footing or a concrete wall.

It is a yet a further object of the present invention to provide a composite panel which is useful as a building material and which has resistance to termite damage.

It is a further object of the present invention to provide a modular concrete form structure for forming a rigid concrete wall.

To accomplish the foregoing objects, there is provided in accordance with one aspect of the present invention a method of preventing damage of a construction material of a building by termites, comprising laying one or more panels, each having a polycarbonate foam layer, on the ground below said building.

In another aspect, the present invention provides a method of constructing a wall, comprising the steps of:
providing a pair of opposing molds having generally vertical inside surfaces between which a space is defined, at least a portion of said molds including one or more panels each having a polycarbonate foam layer,
filling said space with concrete, and
setting said concrete to form said wall with said panels constituting at least part of said wall.

The present invention also provides a wall structure for a building, comprising a vertical concrete wall upwardly extending from the surface of the ground, and one or more panels each having a polycarbonate foam layer and attached to at least part of said wall.

The present invention further provides a composite panel comprising a first, polycarbonate resin foam layer and a second layer laminated on at least one side of said polycarbonate resin foam layer and formed of a material other than a polycarbonate resin, said polycarbonate resin foam layer having an average cell wall thickness of at least 5 μm, an apparent density of 30–600 kg/m³ and a thickness of at least 2 mm.

The present invention further provides a modular concrete form structure comprising a pair of opposing side panels defining therebetween a gap adapted to be filled with concrete and each having a polycarbonate foam layer.

BRIEF DESCRIPTION OF THE DRAWINGS

Other objects, features and advantages of the present invention will become apparent from the detailed description of the preferred embodiments which follows, when considered in light of the accompanying drawings, in which.

DETAILED DESCRIPTION OF THE PREFERRED EMBODIMENTS OF THE INVENTION

Figure 1:
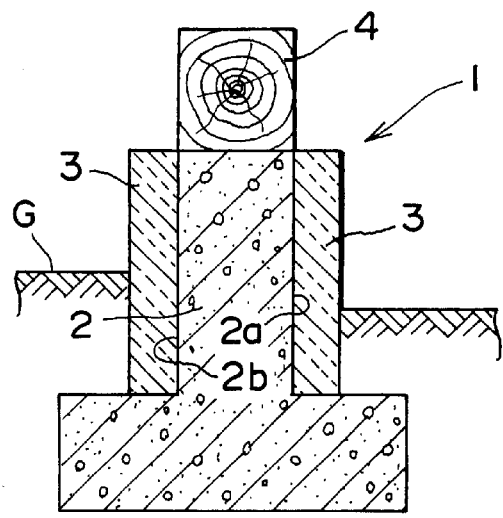
FIG. 1 is a perspective view schematically illustrating one embodiment of a continuous footing according to the present invention.

It has been found that a polycarbonate resin foam can resist termite attacks. In particular, a panel having a polycarbonate resin foam layer can prevent the formation of tunnels and nests therein by termites. Thus, in order to access wood (food), termites must traverse surfaces of walls where they are easily detected.

A polycarbonate resin foam layer may be produced by any known method such as extrusion molding, injection molding or press molding of a composition containing a polycarbonate resin and a blowing agent or by molding polycarbonate resin expanded particles in a mold. An extrusion molding method is preferably adopted for reasons of obtaining a low density foam. Particularly preferred is a method disclosed in U.S. patent application Ser. No. 08/783,206 filed Jan. 14, 1997 and entitled "Process for Producing Foamed Body of Polycarbonate Resin and Foamed Body Obtained Thereby", the disclosure of which is hereby incorporated by reference herein.

The polycarbonate resin is preferably of a type which is obtained from a bisphenol such as 2,2-bis(4-oxyphenyl)propane, 2,2-bis(4-oxyphenyl)butane, 1,1-bis(4-oxyphenyl)cyclohexane, 1, 1-bis(4-oxyphenyl)isobutane or 1,1-bis(4-oxyphenyl)ethane, for reasons of high resistance to heat, acid and weather. A mixture of a relatively high molecular weight polycarbonate resin with a relatively low molecular weight carbonate resin may be suitably used. The molecular weight can be controlled, for example, by controlling lengths of branched chains of the polycarbonate resin. If desired, the polycarbonate resin-containing composition may contain a minor amount of an additional polymer such as a polyethylene, a polyester or an acrylic resin.

The polycarbonate resin-containing composition can also contain one or more desired additives such as a foam-controlling agent (e.g. silica or talc), a flame retarding agent, a heat stabilizing agent, a weatherability improving agent, a plasticizer, a lubricant and a coloring agent.

In the case of extrusion molding, the polycarbonate resin-containing composition is melted and extruded through a die together with a blowing agent to obtain a foamed body such as a panel. Any blowing agent such as an inorganic blowing agent, a volatile organic blowing agent or a decomposition-type blowing agent, may be used for the purpose of the present invention. Examples of suitable volatile organic blowing agents include lower aliphatic hydrocarbons such as propane, n-butane, i-butane, n-pentane, i-pentane and hexane; lower alicyclic hydrocarbons such as cyclobutane and cyclopentane; aromatic hydrocarbons such as benzene, toluene and xylene; aliphatic monohydric alcohols such as methanol and ethanol; lower aliphatic ketones such as acetone and methyl ethyl ketone; and low boiling point halogenated hydrocarbons such as 1-chloro-1,1-difluoroethane, 1,1,1-trifluoroethane, 1-fluoroethane, 1,1,1,3,3-pentafluoropropane, 1,1,1,2-tetrafluoroethane, 1,1-difluoroethane, methylchloride and ethylchloride. Examples of suitable inorganic blowing agents include carbon dioxide, air and nitrogen. The above blowing agents may be used singly or in a combination of two or more thereof.

It is preferred that the polycarbonate resin foam layer have an average cell wall thickness of at least 5 $\mu$m, more preferably 10–1,000 $\mu$m, an apparent density of 30–600 kg/m$^3$, more preferably 40–400 kg/m$^3$, and a thickness of at least 2 mm, more preferably 5–150 mm, for reasons of satisfactory resistance to termite damage, mechanical strength and thermal insulation.

In the present specification, the term "average cell wall thickness" is intended to refer to a thickness T defined by the following formula:

$$T = Dm[(1-Vs)^{-1/3} - 1]$$

wherein Dm represents an average cell diameter and Vs represents a polymer volume fraction.

The average diameter Dm is determined as follows. A polycarbonate resin foam is cut to expose two, i.e. first and second, cut surfaces which are normal to each other. Microphotographs of the first and second cut surfaces are taken. A first, arbitrary straight line is drawn on the microphotograph of the first cut surface such that the first line extends from a wall of one cell and to a wall of another cell and that the first line crosses at least 10 cells. The length (Lx ($\mu$m)) of the first line and the number (Nx) of the cells are measured. In this case, when the thickness of a sample foam is so small that 10 cells do not exist along the first line, the maximum number of the cells present therealong is used as Nx. The mean cell diameter Dx ($\mu$m) is calculated by the following equation:

$$Dx = (Lx/Nx)/0.616$$

Similar measurement is repeated for a second line on the first cut surface which line is normal to the first line, thereby obtaining mean cell diameter Dy ($\mu$m). Similar measurement is also repeated for a third line on the second cut surface which line is normal to the first and second lines, thereby obtaining mean cell diameter Dz ($\mu$m). The average cell diameter Dm ($\mu$m) is an average of Dx, Dy and Dz.

The polymer volume fraction Vs is a volume ratio (Vr/Vf) of the volume Vr of the resin constituting the foam to the volume Vf of the foam.

The panel having a polycarbonate resin foam layer may be composed only of the polycarbonate resin foam or may be a composite panel having the polycarbonate resin foam layer and a second layer laminated on at least one side of the polycarbonate resin foam layer. The second layer is made of a material other than a polycarbonate resin and may be selected, for example, from plastic foams, plastic plates, fiber boards, ceramic plates and wood-based boards.

Examples of fiber boards include glass wool boards, rock wool boards and insulation boards. Examples of plastic foams include polystyrene foams, polyethylene foams, a-polyolefin foams and polyurethane foams. Examples of wood-based boards include particle boards, wafer boards, plywoods and wood boards.

The composite panel may be prepared by laminating the first and second layers by any known method such as by bonding with an adhesive, by coextrusion or by extruding one of the first and second layers over the other layer which has been previously prepared. The composite panel is suitably used in a wide variety of applications such as an insulating material, a damp proofing material, a vibration proofing material, a sound proofing material or a tile. Because of excellent resistance to termite damage, the composite panel is utilized as a construction material such as for ceilings, walls, floors, piers and continuous footings for buildings, especially wooden buildings.

The polycarbonate resin foam panel and the above-described composite panel (for the sake of brevity, both of the polycarbonate resin foam panel and the composite panel will be hereinafter referred to simply as PC resin foam panel) may be used in various manners for the prevention of termite damage of wooden construction materials such as pillars, rafters, walls, sleepers, floor joists, plywoods, braces and sills.

In one embodiment, PC resin foam panels are laid on the ground above which a building is constructed. For example, the panels are laid on the ground under the floor. The panels laid on the ground may be covered with a covering material such as soil or concrete.

In another embodiment, PC resin foam panels are used as molds or forms for constructing a concrete wall, such as a concrete wall for a reinforced concrete building or a continuous footing for a wooden building.

Referring to FIG. 1, generally designated as 1 is one preferred embodiment of a continuous footing according to the present invention. The continuous footing 1 comprises a reinforced concrete foundation 2 having vertical concrete walls 2a and 2b each having a portion located below the ground level G. The continuous footing 1 has one or more PC resin foam panels 3 (consisting of a polycarbonate resin) attached to at least a desired part of said vertical walls 2a and 2b. It is preferred that a surface skin of each panel 3 which is to be in contact wooden construction materials such as pillars, rafters, walls, sleepers, floor joists, plywoods, braces and sills.

In one embodiment, PC resin foam panels are laid on the ground above which a building is constructed. For example, the panels are laid on the ground under the floor. The panels laid on the ground may be covered with a covering material such as soil or concrete.

In another embodiment, PC resin foam panels are used as molds or forms for constructing a concrete wall, such as a concrete wall for a reinforced concrete building or a continuous footing for a wooden building.

Referring to FIG. 1, generally designated as 1 is one preferred embodiment of a continuous footing according to the present invention. The continuous footing 1 comprises a reinforced concrete foundation 2 having vertical concrete walls 2a and 2b each having a portion located below the ground level G. The continuous footing 1 has one or more PC resin foam panels 3 (consisting of a polycarbonate resin) attached to at least a desired part of said vertical walls 2a and 2b. It is preferred that a surface skin of each panel 3 which is to be in contact with the concrete be removed, for reasons of tighter bonding between the concrete surfaces 2a and 2b and the panels 3. The skin of the panel 3 may be removed by any known means such as a knife, a hot wire, a grinder, a sander belt or an abrasive stone. Designated as 4 is a sill secured on a flat continuous top surface of the footing 1 for constructing a wooden building thereon.

The continuous footing 1 may be suitably prepared by using one or more panels 3 as at least part of molds. Namely, a pair of opposing molds having generally vertical inside surfaces between which a space is defined are first constructed. In this case, at least a portion of the molds is formed from one or more polycarbonate foam panels 3. The space is then filled with concrete. After the setting of the concrete, those mold portions which are not made of the foam panels 3 are removed to obtain the continuous footing 1. If desired, the foam panels 3 thus attached to the concrete foundation 2 may be coated with a decorative material such as mortar.

Figure 2:
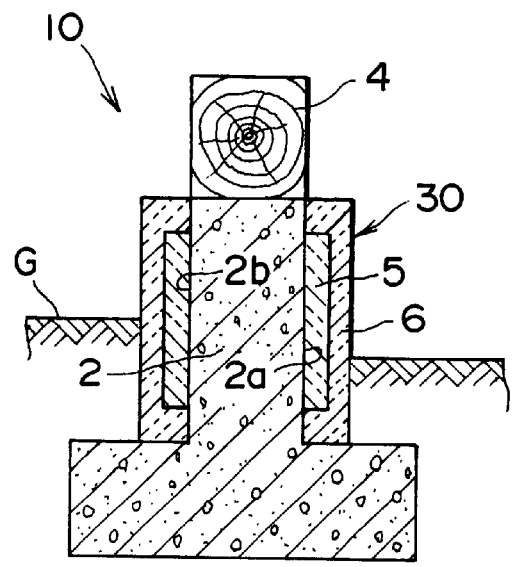
FIG. 2 is a cross-sectional elevational view showing another embodiment of a continuous footing according to the present invention.

Another embodiment of a continuous footing is illustrated in FIG. 2 in which the same reference numerals as those in FIG. 1 designate similar component parts. The continuous footing 10 of this embodiment differs from the footing 1 of FIG. 1 in that composite panels 30 each having a core layer 5 of a polystyrene resin foam and an outer layer 6 of a polycarbonate resin foam are substituted for the panels 3 of FIG. 1. As illustrated, each of the core layers 5 is in contact with the vertical surface 2a or 2b of the concrete foundation 2. Because of the presence of the polystyrene foam core layer 5, the continuous footing 10 has improved heat insulation properties. The continuous footing 10 may also be prepared in the same manner as described above with reference to FIG. 1.

Figure 3:
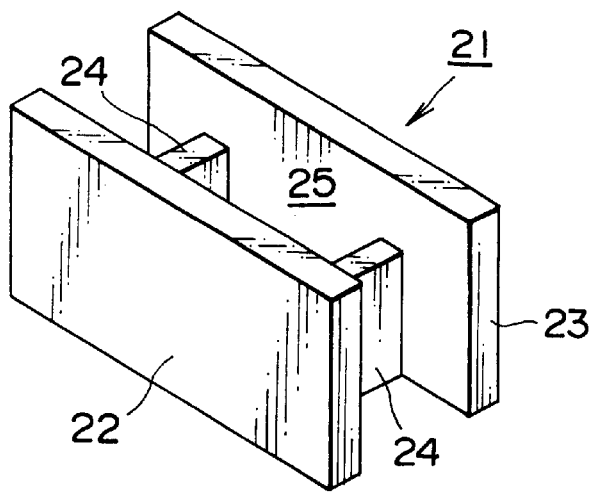
FIG. 3 is a perspective view schematically illustrating a modular concrete form structure.

In a further embodiment, PC resin foam panel is used for producing a modular concrete form structure such as illustrated in FIG. 3. Designated as 21 is a hollow rectangular shaped building block framework element having first and second oppositely disposed parallel side panels 22 and 23 each formed of a PC resin foam panel. The side panels 22 and 23 are connected by ribs 24 and define therebetween a gap 25 adapted to be filled with concrete. The ribs 24 may also be made of a PC resin foam panel. A multiplicity of such block elements 21 are stacked one above the other and side-by-side, preferably, in an interlocked state to provide a rigid concrete wall providing insulating value and termite resistance.

Such a modular concrete form structure may be modified into various constructions as disclosed in, for example, U.S. Pat. No. 4,439,967, U.S. Pat. No. 4,706,429 and U.S. Pat. No. 4,894,969, the disclosures of which are hereby incorporated by reference herein.

The following examples will further illustrate the present invention.

EXAMPLE 1

To 100 parts by weight of an aromatic polycarbonate resin (1:1 wt/wt mixture of IDEMITSU POLYCARBONATE 1B2500 (manufactured by Idemitsu Petrochemical Inc.) with IUPILON E2000 (manufactured by Mitsubishi Engineering Plastic Inc.)) was melted and mixed with 0.03 part by weight of talc in an extruder to obtain a blend. After charging 2.7 parts by weight of n-pentane to the extruder, the blend was extruded through a die lip and allowed to foam. The foamed mass was immediately guided between a pair of upper and lower plates and cooled therebetween to a temperature lower than the softening point of the resin to obtain a plate having a thickness of 20 mm, an average cell wall thickness of 24 $\mu$m and an apparent density of 92 kg/m$^3$.

The polycarbonate foam plate thus obtained was cut to obtain a test sample having a size of 100 mm×100 mm×24 mm. Thus, the test sample had four sides (20 mm×100 mm size) at which cells were exposed by cutting, and two opposing sides (100 mm×100 mm size) at which no cells were exposed because of the presence of skins. The test sample was embedded horizontally in the soil, flush with the surface of the soil, contained in a vessel in which a predetermined number of termites were contained. After placing a wood piece (as a feed) on the exposed surface of the test sample, rearing of the termites was continued for 4 months. The test sample was then taken out of the vessel and observed for damage by termites. The results were as summarized in Table 1 below.

Incidentally, the test sample after the 4 months exposure to the termites showed no damage on the four sides at which the cells were exposed. On the other hand, small depressions (depth of about 0.5 mm) were found to form on the remaining two skin-bearing sides. This fact suggests that the removal of the skin layer is effective in improving the resistance to attack by termites.

EXAMPLE 2

A polycarbonate resin foam plate having a thickness of 24 mm, an average cell wall thickness of 37 $\mu$m and an apparent density of 64 kg/m$^3$ was prepared in the same manner as that in Example 1 except that the amount of talc was reduced to 0.02 part by weight and the amount of n-pentane was increased to 4 parts by weight. The plate was cut to obtain a sample plate of a 100 mm×100 mm×24 mm size. The test sample was tested for termite damage in the same manner as that in Example 1. The results are summarized in Table 1 below.

Comparative Example 1

A polypropylene resin foam plate having an ethylene content of 2.4% by weight (apparent density: 15 kg/m$^3$) was cut to obtain a sample plate of a 100 mm×100 mm×20 mm size and having an average cell wall thickness as shown in Table 1 below. The test sample was tested for termite damage in the same manner as that in Example 1 except that the test period was reduced to 2 weeks. The results are summarized in Table 1 below.

Comparative Example 2

A polypropylene resin foam plate having an ethylene content of 2.4% by weight (apparent density: 90 kg/m$^3$ was cut to obtain a sample plate of a 100 mm×100 mm×20 mm size and having an average cell wall thickness as shown in Table 1 below. The test sample was tested for termite damage in the same manner as that in Comparative Example 1. The results are summarized in Table 1 below.

Comparative Example 3

A low density polyethylene resin foam plate (apparent density: 36 kg/m$^3$) was cut to obtain a sample plate of a 100 mm×100 mm×20 mm size and having an average cell wall thickness as shown in Table 1 below. The test sample was tested for termite damage in the same manner as that in Comparative Example 1. The results are summarized in Table 1 below.

Comparative Example 4

A polystyrene resin foam plate (apparent density: 70 kg/m$^3$) was cut to obtain a sample plate of a 100 mm×100 mm×30 mm size and having an average cell wall thickness as shown in Table 1 below. The test sample was tested for termite damage in the same manner as that in Comparative Example 1. The results are summarized in Table 1 below.

Comparative Example 5

A polystyrene resin foam plate (apparent density: 35 kg/m³) was cut to obtain a sample plate of a 100 mm×100 mm×30 mm size and having an average cell wall thickness as shown in Table 1 below. The test sample was tested for termite damage in the same manner as that in Comparative Example 1. The results are summarized in Table 1 below.

Comparative Example 6

A polystyrene resin foam plate (apparent density: 263 kg/m³) was cut to obtain a sample plate of a 100 mm×100 mm×30 mm size and having an average cell wall thickness as shown in Table 1 below. The test sample was tested for termite damage in the same manner as that in Comparative Example 1 except that the test period was increased to 6 weeks. The results are summarized in Table 1 below.

EXAMPLE 3

A polycarbonate resin obtained from bisphenol A was pelletized to obtain resin particles (average weight: 2 mg, L/D=1). The resin particles were placed in an autoclave together with water. The contents in the autoclave were pressurized with a carbon dioxide gas to impregnate the resin particles with the gas. The pressure within the autoclave was released to obtain carbon dioxide-impregnated resin particles. After removing water deposits, the resin particles were contacted with steam to produce expanded particles. The expanded particles were then impregnated with a carbon dioxide gas, placed in a mold cavity, molded with steam in the mold cavity, cooled to room temperature and aged to obtain a polycarbonate resin foam plate having a thickness of 25 mm, an average cell wall thickness of 3 μm and an apparent density of 150 kg/m³. The plate was cut to obtain a sample plate of a 100 mm×100 mm×25 mm size. The test sample was tested for termite damage in the same manner as that in Example 1. The results are summarized in Table 1 below.

In Table 1, the results of the termite damage test are evaluated in accordance with the following ratings:

A: Very slight depressions are observed on surfaces of test sample but no through holes are formed in the test sample.

B: Through holes are formed in the test sample.

C: Through holes are formed in considerable numbers in the test sample.

D: Through holes are so numerous in the test sample that the test sample lost its original shape.

TABLE 1

| Example No. | Resin | Cell wall Thickness (μm) | Density (kg/m³) | Thickness (mm) | Test Period | Result |
|---|---|---|---|---|---|---|
| Ex. 1 | Polycarbonate | 24 | 92 | 20 | 4 months | A |
| Ex. 2 | Polycarbonate | 37 | 64 | 24 | 3 months | A |
| Comp. Ex. 1 | Polypropylene | 2 | 15 | 20 | 2 weeks | C |
| Comp. Ex. 2 | Polypropylene | 11 | 90 | 20 | 2 weeks | D |
| Comp. Ex. 3 | Polyethylene | 8 | 36 | 20 | 2 weeks | C |
| Comp. Ex. 4 | Polystyrene | 17 | 70 | 30 | 2 weeks | C |
| Comp. Ex. 5 | Polystyrene | 6 | 35 | 30 | 2 weeks | D |
| Comp. Ex. 6 | Polystyrene | 108 | 263 | 30 | 6 weeks | B |
| Ex. 3 | Polycarbonate | 3 | 150 | 25 | 3 months | B |

What is claimed is:

1. A method of preventing damage of a construction material of a building by termites, comprising laying one or more panels each having a polycarbonate foam layer on the ground below said building, wherein said polycarbonate foam has an apparent density of 30–600 kg/m³.

2. A method as claimed in claim 1, further comprising covering said panels with soil.

3. A method as claimed in claim 1, wherein said polycarbonate resin foam layer has an average cell wall thickness of at least 5 μm.

4. A method of constructing a wall, comprising the steps of:
   (a) providing a pair of opposing molds having generally vertical inside surfaces between which a space is defined, at least a portion of said molds including one or more panels each having a polycarbonate foam layer with an apparent density of 30–600 kg/m³,
   b) filling said space with concrete, and
   c) setting said concrete to form said wall having said panels constituting at least part of said wall.

5. A method as claimed in claim 4, wherein said wall is a vertical wall of a continuous footing on which a wooden building is constructed.

6. A method as claimed in claim 4, wherein said opposing molds constitute side panels of a modular concrete form structure.

7. A method as claimed in claim 4, wherein said polycarbonate resin foam layer has an average cell wall thickness of at least 5 μm and a thickness of at least 2 mm.

8. A method as claimed in claim 4, further comprising covering said panels with a decorative material after step (c).

9. A wall structure for a building, comprising a vertical concrete wall upwardly extending from a surface of the ground, and one or more panels each having a polycarbonate foam layer and attached to at least part of said wall, said polycarbonate foam layer having an apparent density of 30–600 kg/m³.

10. A wall structure as claimed in claim 9, wherein said concrete wall is a vertical wall of a continuous footing on which a wooden building is constructed.

11. A wall structure as claimed in claim 9, wherein said polycarbonate resin foam layer has an average cell wall thickness of at least 5 μm, and a thickness of at least 2 mm.

12. A building comprising a wall structure according to claim 9.

13. A composite panel comprising a first, polycarbonate resin foam layer and a second layer laminated on at least one side of said polycarbonate resin foam layer and formed of a material other than a polycarbonate resin, said polycarbonate resin foam layer having an average cell wall thickness of at least 5 μm, an apparent density of 30–600 kg/m³ and a thickness of at least 2 mm.

14. A modular concrete form structure comprising a pair of opposing side panels defining a gap therebetween for being filled with concrete and each having a polycarbonate foam layer with an apparent density of 30–600 kg/m$^3$.

15. A method as claimed in claim 4, wherein said wall is a wall of a concrete building extending from the ground.

16. A wall structure as claimed in claim 9, wherein said concrete wall is a wall of concrete building.

17. A method as claimed in claim 1 further comprising covering said panels with concrete.

* * * * *

UNITED STATES PATENT AND TRADEMARK OFFICE
CERTIFICATE OF CORRECTION

PATENT NO.    : 6,256,937 B1
DATED         : July 10, 2001
INVENTOR(S)   : Kogure et al.

It is certified that error appears in the above-identified patent and that said Letters Patent is hereby corrected as shown below:

<u>Column 8,</u>
Line 25, after "µm" insert -- and a thickness of at least 2 mm. --.

Signed and Sealed this

Twentieth Day of August, 2002

Attest:

JAMES E. ROGAN
*Attesting Officer*           *Director of the United States Patent and Trademark Office*